United States Patent [19]

Wagner, Jr.

[11] Patent Number: 5,230,183
[45] Date of Patent: Jul. 27, 1993

[54] CYLINDER HEAD RESURFACING APPARATUS AND METHOD

[76] Inventor: James W. Wagner, Jr., 65 Alpine St., Garfield, N.J. 07026

[21] Appl. No.: 890,241

[22] Filed: May 29, 1992

[51] Int. Cl.⁵ .................................................. B24B 41/06
[52] U.S. Cl. .................................... 51/217 R; 51/125; 51/216 R; 269/242
[58] Field of Search ............... 51/217 R, 217 P, 98 R, 51/125; 269/242, 247

[56] References Cited

U.S. PATENT DOCUMENTS

| | | | |
|---|---|---|---|
| 2,329,382 | 9/1943 | Blazek et al. | 51/165 |
| 2,692,462 | 10/1954 | Robertson | 51/217 |
| 2,851,831 | 9/1958 | Healy | 51/217 R |
| 3,114,991 | 12/1963 | Flowers et al. | 51/277 |
| 3,274,867 | 9/1966 | Sell | 82/39 |
| 3,821,867 | 7/1974 | Hunkeler et al. | 51/215 R |
| 3,935,679 | 2/1976 | Peter et al. | 51/239 |
| 4,069,624 | 1/1978 | Henry, Jr. | 51/241 B |
| 4,127,942 | 12/1978 | Flaten . | |
| 5,152,707 | 10/1992 | Dougherty et al. | 51/217 R |

*Primary Examiner*—Bruce M. Kisliuk
*Assistant Examiner*—Eileen P. Morgan
*Attorney, Agent, or Firm*—Samuelson & Jacob

[57] ABSTRACT

Apparatus and method for resurfacing the cylinder head of an internal combustion engine as by grinding a minimal amount of material from the cylinder head along a joining surface of the cylinder head in a grinding machine including a grinding wheel which traverses a grinding plane. The cylinder head is attached to a locator assembly having locator surfaces for coacting with the joining surface of the cylinder head and with support surfaces for supporting the locator assembly and the attached cylinder head in a grinding position relative to the grinding plane, and the cylinder head is secured in place in the grinding position for subsequent detachment and removal of the locator assembly to expose the joining surface of the cylinder head to the grinding wheel of the grinding machine for completing the resurfacing operation.

12 Claims, 3 Drawing Sheets

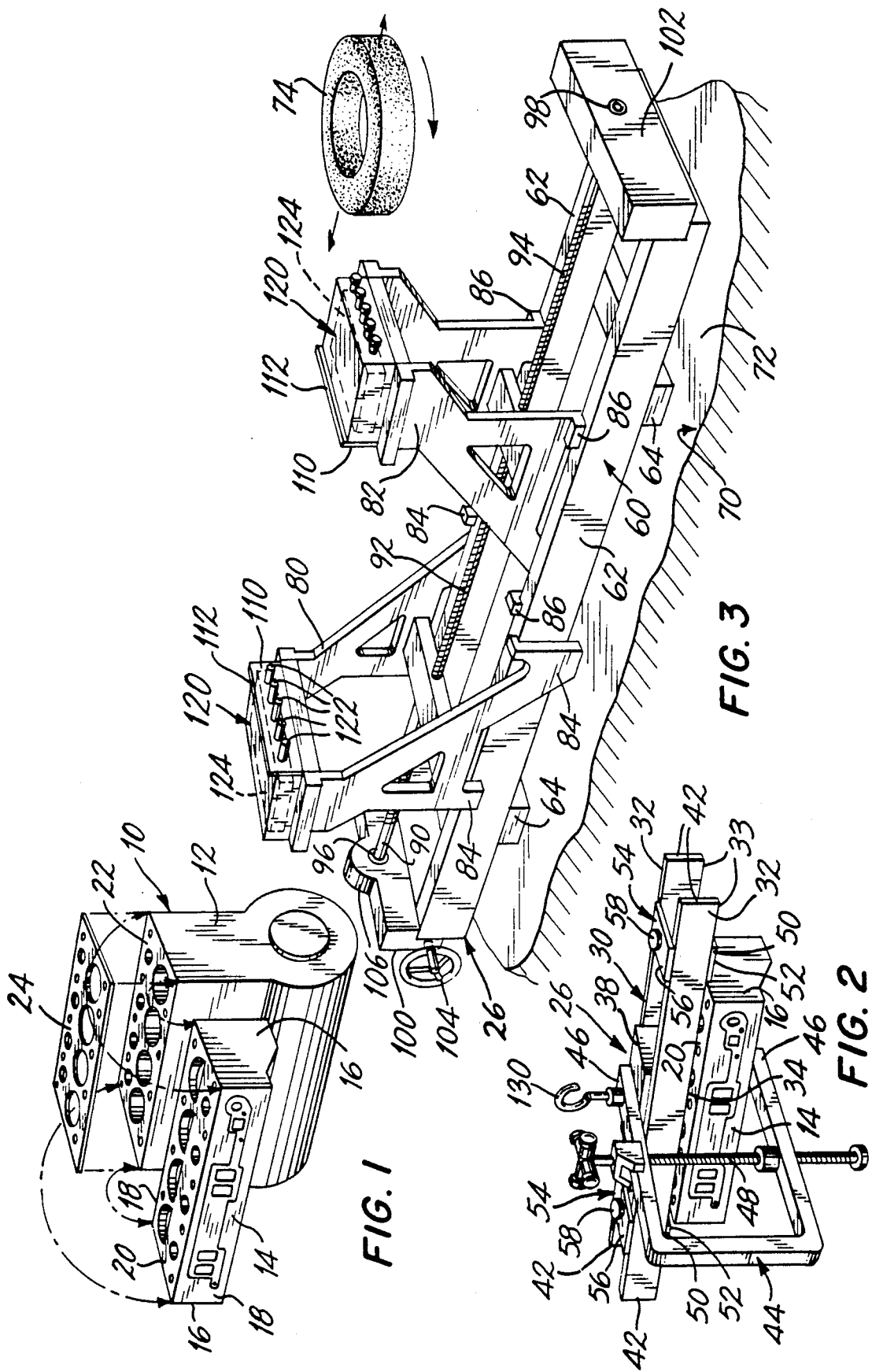

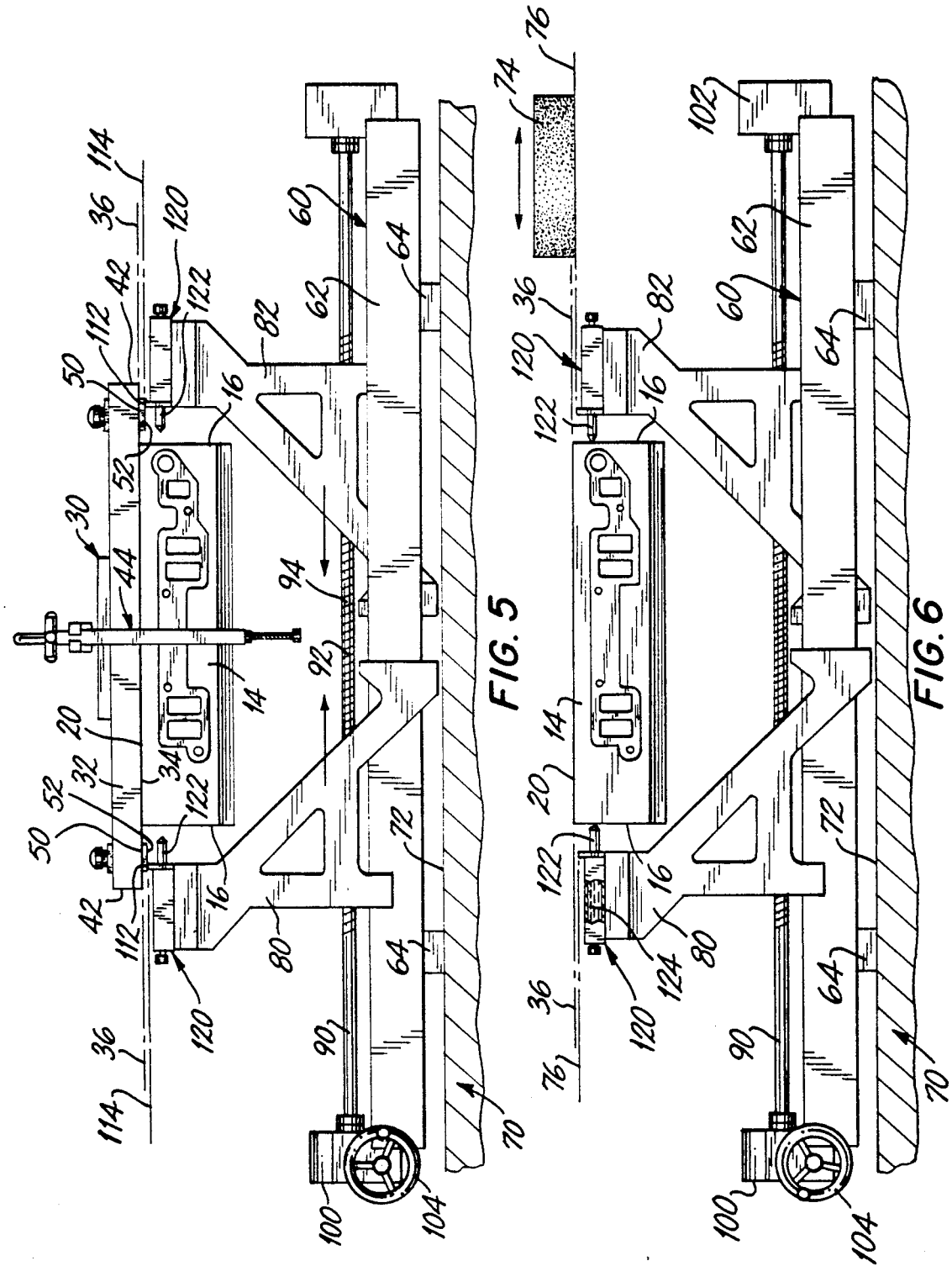

CYLINDER HEAD RESURFACING APPARATUS AND METHOD

The present invention relates generally to the reconditioning of cylinder heads of internal combustion engines and pertains, more specifically, to apparatus and method for facilitating the removal of small amounts of material at the joining surface of a cylinder head, as by grinding or otherwise machining the joining surface to resurface the cylinder head.

It is common practice in the reconditioning of a cylinder head of an internal combustion engine to resurface the cylinder head by removing a relatively small amount of material from the cylinder head, usually by a grinding operation, along the surface of the cylinder head which, in the assembled engine, engages and is joined to the cylinder block of the engine. That surface of the cylinder head is referred to herein as the joining surface and is a planar surface which extends along essentially the entire length and width of the cylinder head. In order to be effective, such resurfacing must remove a minimal amount of material from the cylinder head and must leave the newly formed surface precisely parallel with the original joining surface of the cylinder head. Various fixtures and procedures are available for locating the cylinder head relative to machining apparatus, such as the grinding wheel of a grinding machine, to attain the desired result. However, these fixtures and procedures often require time-consuming operations carried out with a high degree of skill in order to attain the level of precision necessary for accomplishing the desired result.

The present invention enables the necessary precision in a more expeditious manner, without requiring a high degree of skill to attain the desired result As such, the present invention provides an improvement which attains several objects and advantages, some of which are summarized as follows: Facilitates the resurfacing of cylinder heads by enabling a high degree of precision in the machining of the joining surface of the cylinder head, as by grinding, in an expeditious manner; reduces the requirement for highly skilled operators while maintaining efficiency and accuracy in cylinder head resurfacing operations; increases the rate of production while reducing errors for more effective cylinder head resurfacing; provides simplified apparatus and method for accomplishing the appropriate resurfacing of cylinder heads with increased ease and without requiring extensive modifications to existing facilities and machinery currently in use in resurfacing operations; enables the maintenance of high standards of quality at minimal expense.

The above objects and advantages, as well as further objects and advantages, are attained by the present invention which may be described briefly as apparatus for use in resurfacing a cylinder head of an internal combustion engine by removing a small amount of material from the cylinder head along a joining surface of the cylinder head, which joining surface is that surface along which the cylinder head is to be joined with the cylinder block of the engine, the removal of the small amount of material being accomplished as by passing a grinding wheel along a grinding plane intercepting the cylinder head adjacent the joining surface, the apparatus comprising: a frame; support members on the frame, the support members including upwardly-facing support surfaces defining predetermined altitudinal locations relative to the grinding plane; a locator having at least a first locator surface for coaction with the cylinder head and at least a second locator surface for coaction with the support surfaces such that upon coaction of the first locator surface with the cylinder head and coaction of the second locator surface with the support surfaces, the cylinder head is placed in a grinding position wherein the joining surface of the cylinder head is located in a plane parallel to the grinding plane and faces upwardly; first securing means for selectively securing the cylinder head to the locator for placement of the cylinder head in the grinding position; and second securing means for securing the cylinder head to the frame in the grinding position, with the joining surface juxtaposed with the grinding plane, and facing upwardly, enabling subsequent release of the locator from the cylinder head, when the cylinder head is secured to the frame, for removal of the locator to expose the joining surface of the cylinder head to the grinding wheel as the grinding wheel traverses the grinding plane. Further, the invention contemplates the method for resurfacing a cylinder head of an internal combustion engine by removing a small amount of material from the cylinder head along a joining surface of the cylinder head, which joining surface is that surface along which the cylinder head is to be joined with the cylinder block of the engine, the removal of the small amount of material being accomplished as by passing a grinding wheel along a grinding plane intercepting the cylinder head adjacent the joining surface, the method comprising: securing the cylinder head to at least one locator having a first locator surface for locating the joining surface relative to the locator, and a second locator surface for locating the locator relative to the grinding plane; locating the locator relative to the grinding plane to place the cylinder head in a grinding position wherein the joining surface of the cylinder head faces upwardly and is juxtaposed with the grinding plane; securing the cylinder head in the grinding position; and releasing the locator from the cylinder head and removing the locator to expose the joining surface to the grinding wheel as the grinding wheel traverses the grinding plane.

The invention will be understood more fully, while still further objects and advantages will become apparent, in the following detailed description of preferred embodiments of the invention illustrated in the accompanying drawing, in which:

FIG. 1 is a somewhat diagrammatic, perspective view of an internal combustion engine illustrating a cylinder head to be resurfaced utilizing apparatus and method of the present invention;

FIG. 2 is a perspective view of a portion of apparatus constructed in accordance with the present invention, and illustrates part of the method of the present invention;

FIG. 3 is a perspective view of another portion of the apparatus;

FIG. 5 is a front elevational view similar to FIG. 4, but illustrating another operating position of the component parts of the apparatus and another step of the method; and FIG. 6 is a front elevational view similar to FIG. 5, but illustrating still another operating .position of the component parts of the apparatus and still another step of the method.

Figure 4:
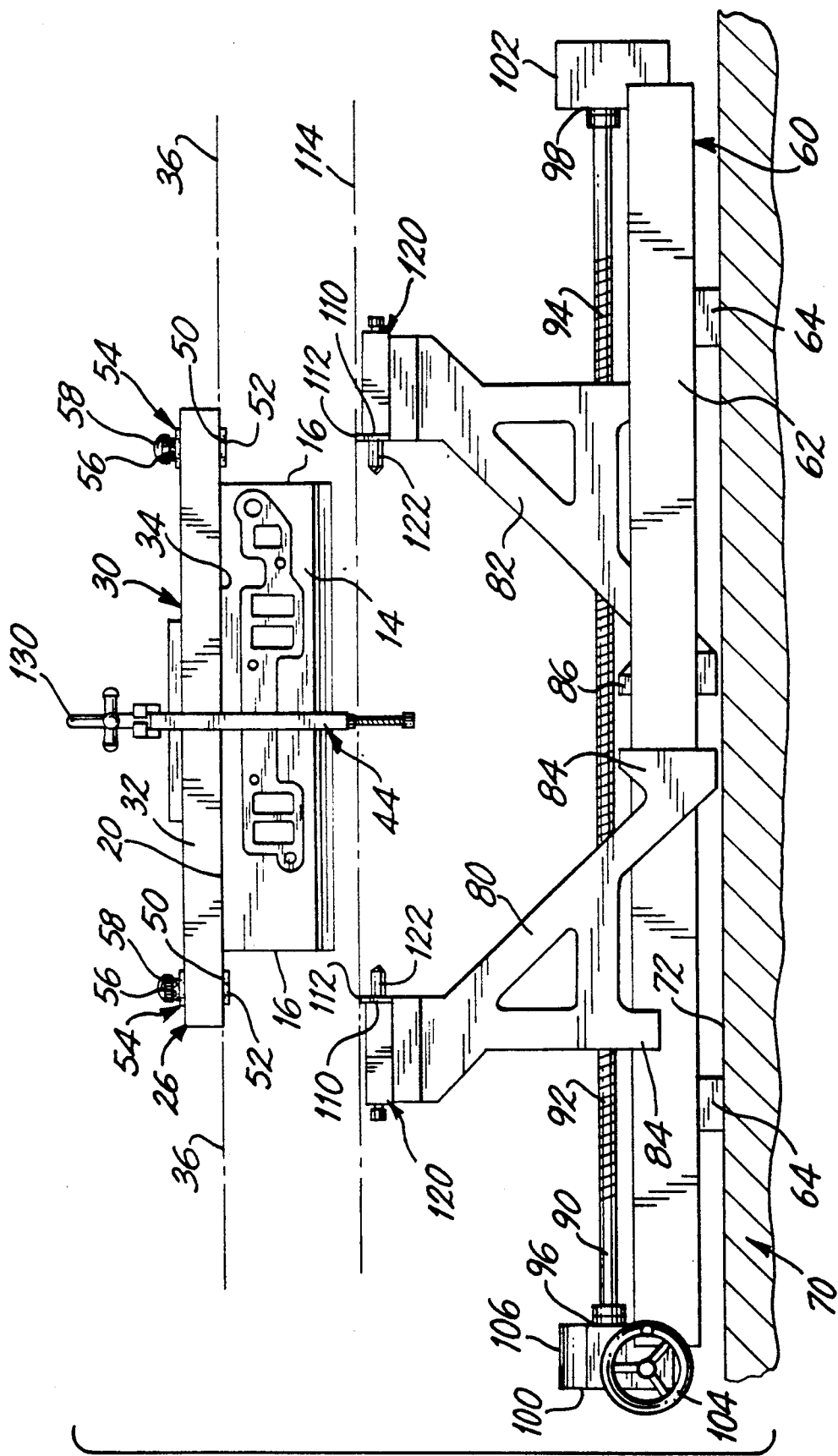
FIG. 4 is a front elevational view showing the apparatus and the method during a stage of use.

Referring now to the drawing, and especially to FIG. 1 thereof, an internal combustion engine 10 is seen to have a cylinder block 12 and a cylinder head 14 which has been removed from the cylinder block 12 for reconditioning. The cylinder head 14 extends longitudinally between opposite ends 16 and laterally between opposite sides 18 and includes a generally planar joining surface 20. When the engine 10 is assembled, joining surface 20 is juxtaposed with complementary surface 22 on the cylinder block 12, usually with a gasket 24 interposed between the cylinder head 14 and the cylinder block 12. The cylinder head 14 is to be resurfaced by removing a small amount of material from the cylinder head 14, at the joining surface 20, as by grinding the material from the cylinder head 14, to establish a newly formed surface which will serve as a new joining surface. It is imperative that the new joining surface be planar and parallel to the original joining surface 20. To that end, cylinder head 14 is oriented as shown, with joining surface 20 facing upwardly, for further operations, as follows.

Turning now to FIGS. 2 and 3, an apparatus constructed in accordance with the invention is illustrated at 26 and is seen to include a locator assembly 30 shown attached to the cylinder head 14. Locator assembly 30 includes a pair of locator bars 32 having lower edges 33 which include downwardly-facing locator surfaces 34 for engaging and coacting with the upwardly-facing joining surface 20 of the cylinder head 14 so that the joining surface 20 is placed in a plane 36 (see FIGS. 4, 5 and 6) containing the locator surfaces 34 when the locator assembly 30 is affixed to the cylinder head 14, as shown. The locator bars 32 are secured together in the locator assembly 30 by a central block 38, which may be welded to the locator bars 32, and the locator bars 32 extend longitudinally between opposite ends 42. Securing means is shown in the form of a clamp 44 having opposed jaws 46 which are biased toward one another by a clamp screw 48 to clamp the cylinder head 14 to the locator assembly 30, with the joining surface 20 against the locator surfaces 34, as shown.

A spacer member 50 is affixed to the locator bars 32 at the lower edges 33 adjacent each end 42 of the locator bars 32. The spacer members 50 provide further downwardly-facing locator surfaces 52 placed beyond the ends 16 of the cylinder head 14 for purposes which will be described below. The longitudinal location of each spacer member 50 may be adjusted to accommodate the particular length of cylinder head 14. Thus, each spacer member 50 straddles the pair of locator bars 32, beneath the locator bars 32, and is a part of a spacer assembly 54 which includes a bridge 56 straddling the locator bars 32 above the locator bars 32. A bolt 58 passes through each bridge 56 and is threaded into a corresponding spacer member 50 such that upon loosening of a bolt 58 the corresponding spacer assembly 54 may be moved along the locator bars 32 to a selected longitudinal position and then locked in place by tightening the bolt 58.

As best seen in FIG. 3, apparatus 26 further includes a frame 60 having a pair of longitudinal parallel rails 62 secured together by lateral base members 64. In use, apparatus 26 is placed in a machine tool, such as grinding machine 70, with the base members 64 located on the bed 72 of the grinding machine 70, beneath a grinding wheel 74 which traverses a grinding plane 76 (see FIG. 6) in longitudinal directions to accomplish the grinding necessary for the desired resurfacing of the cylinder head 14. A pair of opposed carrier members 80 and 82 are coupled with the rails 62 by means of respective slides 84 and 86, which are unitary with the respective carrier members 80 and 82, and which engage the rails 62 for relative sliding movement, so that the carrier members 80 and 82 are moveable along the rails 62 in longitudinal directions toward and away from one another. A lead screw 90 having opposite threads 92 and 94 is journaled at 96 and 98, adjacent the opposite ends of the lead screw 90, for rotation about the longitudinal axis of the lead screw 90 within end blocks 100 and 102 which are integral with rails 62 in frame 60. A hand wheel 104 is coupled to the lead screw 90 through a right-angle reduction gear drive 106 such that selective rotation of the hand wheel 104 will rotate the lead screw 90 and move the carrier members 80 and 82 along rails 62 longitudinally toward or away from one another.

Each carrier member 80 and 82 carries a support member 110 coupled with each carrier member 80 and 82 for movement with the respective carrier member 80 and 82. Each support member 110 has an upwardly-facing support surface 112, and the support surfaces 112 are placed in a plane 114 (see FIG. 4) parallel to the grinding plane 76. In practice, support surfaces 112 may be established by grinding the support members 110 with at least one pass of the grinding wheel 74, after locating the base members 64 on the bed 72 of the grinding machine 70, to establish the support surfaces 112 and assure that the support surfaces 112 lie in plane 114 parallel to the grinding plane 76. A clamp assembly 120 is mounted upon each carrier member 80 and 82, adjacent support members 110, for movement with each carrier member 80 and 82. Each clamp assembly 120 includes a plurality of clamp pins 122 extending in a longitudinal direction and moveable in longitudinal directions relative to one another within each clamp assembly 120. Clamp pins 122 are coupled with one another by means of an internal hydraulic coupling circuit 124, in a known manner, for purposes which will be set forth in greater detail below.

Referring now to FIGS. 4 and 5, as well as to FIGS. 2 and 3, once the cylinder head 14 is attached to the locator assembly 30, by means of the clamp 44, as described above, the locator assembly 30 is joined with the remainder of the apparatus 26. The carrier members 80 and 82 are moved apart, as seen in FIG. 4, a longitudinal distance sufficient to admit the cylinder head 14 between the opposed clamp pins 122 of opposite clamp assemblies 120, the longitudinal distance also establishing a longitudinal spacing between the support members 110 corresponding generally to the longitudinal spacing between the spacer assemblies 54 of the locator assembly 30. The locator assembly 30, with the cylinder head 14 attached to the locator assembly 30, then is lowered onto the carrier members 80 and 82, as seen in FIG. 5, utilizing handling hook 130 (also see FIG. 2) to assist in manipulating the locator assembly 30, with the attached cylinder head 14, for appropriate location of the locator assembly 30 on the carrier members 80 and 82. In placing the locator assembly 30 on the carrier members 80 and 82, the downwardly-facing locator surfaces 52 on the spacer members 50 are located on the upwardly-facing support surfaces 112 on the support members 110 so that the locator surfaces 52 coact with the support surfaces 112 to locate the joining surface 20 of the cylinder head 14 parallel with the grinding plane 76, by virtue of the joining surface 20 having been placed in plane 36 as a result of the coaction between the downwardly-facing locator surfaces 34 of the locator bars 32 of the locator assembly 30 and the joining surface 20 of the cylinder head 14. Thus, joining surface 20 of the cylinder head 14 is placed parallel with the grinding plane 76 with precision and with minimal effort and skill.

Once the cylinder head 14 is located in the grinding position described above, hand wheel 104 is actuated to rotate the lead screw 90 and bring the carrier members 80 and 82 toward one another until the clamp pins 122 of clamp assemblies 120 engage the cylinder head 14 to clamp the cylinder head 14 in place. Thus, the carrier members 80 and 82 and the clamp assemblies 120 serve as securing means for securing the cylinder head 14 in the grinding position within frame 60. The surface contours at the ends 16 of the cylinder head 14 engaged by the clamp pins 122 are accommodated by axial movement of the clamp pins 122 relative to one another, as permitted by the hydraulic coupling circuit 124, so that the cylinder head 14 is clamped firmly in place at the grinding position. Upon clamping the cylinder head 14 in place at the grinding position between the clamping assemblies 120, as seen in FIG. 6, the locator assembly 30 is removed, by releasing the clamp 44, and the joining surface 20 of the cylinder head 14 is exposed, facing upwardly, for further operations. Joining surface 20 lies in plane 36 which is parallel to plane 114 and preferably spaced altitudinally above plane 114 by a distance determined by the location of the downwardly-facing locator surfaces 52 of the spacer members 50 relative to the downwardly-facing locator surfaces 34 of the locator bars 32. Grinding machine 70 then is operated to locate the grinding plane 76 relative to plane 36 of the joining surface 20 of the cylinder head 14 so that the grinding plane 76 intercepts the cylinder head 14 adjacent the joining surface 20 for removal of a small amount of material from the cylinder head 14 to establish a new joining surface precisely parallel to the original joining surface 20 with minimal removal of material from the cylinder head 14. The grinding wheel 74 of the grinding machine 70 then is made to traverse the grinding plane 76 to remove only a minimal amount of material from the cylinder head 14 and establish the new joining surface for completion of the resurfacing procedure. Once the resurfacing procedure is complete, the hand wheel 104 is actuated to move the carrier members 80 and 82 longitudinally away from one another and release the cylinder head 14 from the grip of the clamp assemblies 120.

It will be seen that the present invention attains the objects and advantages summarized above; namely: Facilitates the resurfacing of cylinder heads by enabling a high degree of precision in the grinding of the joining surface of the cylinder head in an expeditious manner; reduces the requirement for highly skilled operators while maintaining efficiency and accuracy in cylinder head resurfacing operations; increases the rate of production while reducing errors for more effective cylinder head resurfacing; provides simplified apparatus and method for accomplishing the appropriate resurfacing of cylinder heads with increased ease and without requiring extensive modifications to existing facilities and machinery currently in use in resurfacing operations; enables the maintenance of high standards of quality at minimal expense.

It is to be understood that the above detailed description of preferred embodiments of the invention is provided by way of example only. Various details of design, construction and procedure may be modified without departing from the true spirit and scope of the invention as set forth in the appended claims.

The embodiments of the invention in which an exclusive property or privilege is claimed are defined as follows:

1. Apparatus for use in resurfacing a cylinder head of an internal combustion engine by removing a small amount of material from the cylinder head along a joining surface of the cylinder head, which joining surface is that surface along which the cylinder head is to be joined with the cylinder block of the engine, the removal of the small amount of material being accomplished as by passing a grinding wheel along a grinding plane intercepting the cylinder head adjacent the joining surface, the apparatus comprising:

a frame;

support members on the frame, the support members including upwardly-facing support surfaces defining predetermined altitudinal locations relative to the grinding plane;

a locator having at least a first locator surface for coaction with the joining surface of the cylinder head, and at least a second locator surface for coaction with the support surfaces such that upon coaction of the first locator surface with the joining surface of the cylinder head and coaction of the second locator surface with the support surfaces, the cylinder head is placed in a grinding position wherein the joining surface of the cylinder head is located in a plane parallel to the grinding plane and faces upwardly;

first securing means for selectively securing the cylinder head to the locator with the joining surface juxtaposed with the first locator surface for placement of the cylinder head in the grinding position; and second securing means for securing the cylinder head to the frame in the grinding position, with the joining surface juxtaposed with the grinding plane, and facing upwardly, enabling subsequent release of the locator from the cylinder head, when the cylinder head is secured to the frame, for removal of the locator to expose the joining surface of the cylinder head to the grinding wheel as the grinding wheel traverses the grinding plane.

2. The invention of claim 1 wherein the upwardly-facing support surfaces are located in a support plane parallel to the grinding plane.

3. The invention of claim 2 wherein the first and second locator surfaces are located in respective first and second locator planes.

4. The invention of claim 3 wherein the first locator plane is placed altitudinally above the second locator plane when the second locator surface coacts with the support surfaces.

5. The invention of claim 3 wherein the locator includes locator bars each having a longitudinal extent greater than the predetermined length of the cylinder head, the first and second locator surfaces being placed on each of the locator bars such that upon coaction of the first locator surfaces with the joining surface of the cylinder head, the second locator surfaces are placed longitudinally beyond the cylinder head for resting upon the upwardly-facing support surfaces.

6. The invention of claim 1 wherein the first securing means includes a first clamp for selectively clamping the cylinder head to the locator and for selectively releasing the locator from the cylinder head.

7. The invention of claim 6 wherein the second securing means includes a second clamp for selectively clamping the cylinder head to the frame in the grinding position and for selectively releasing the cylinder head from the frame.

8. The invention of claim 7 wherein the locator comprises a locator assembly including a pair of locator bars, each locator bar having a longitudinal extent greater than the predetermined length of the cylinder head, the first and second locator surfaces being placed on each of the locator bars such that upon coaction of the first locator surfaces with the joining surface of the cylinder head, the second locator surfaces are placed longitudinally beyond the cylinder head for resting upon the upwardly-facing support surfaces.

9. The invention of claim 8 wherein the second locator surfaces are spaced altitudinally relative to the first locator surfaces so that the plane of the joining surface is located altitudinally above the support surfaces when the second locator surfaces coact with the support surfaces.

10. The method for resurfacing a cylinder head of an internal combustion engine by removing a small amount of material from the cylinder head along a joining surface of the cylinder head, which joining surface is that surface along which the cylinder head is to be joined with the cylinder block of the engine, the removal of the small amount of material being accomplished as by passing a grinding wheel along a grinding plane intercepting the cylinder head adjacent the joining surface, the apparatus comprising:

securing the cylinder head to at least one locator having a first locator surface for coaction with the joining surface to locate the joining surface relative to the locator, and a second locator surface for locating the locator relative to the grinding plane;

locating the locator relative to the grinding plane with the joining surface juxtaposed with the first locator surface to place the cylinder head in a grinding position wherein the joining surface of the cylinder head faces upwardly and is juxtaposed with the grinding plane;

securing the cylinder head in the grinding position; and releasing the locator from the cylinder head and removing the locator to expose the joining surface to the grinding wheel as the grinding wheel traverses the grinding plane.

11. The invention of claim 10 wherein the joining surface, when juxtaposed with the grinding plane, is located altitudinally above the second locator surface.

12. The invention of claim 10 wherein the cylinder head is secured to the locator by selectively clamping the cylinder head to the locator, and the locator is released from the cylinder head by selectively unclamping the cylinder head from the locator.

* * * * *

UNITED STATES PATENT AND TRADEMARK OFFICE
CERTIFICATE OF CORRECTION

PATENT NO.   : 5,230,183
DATED        : July 27, 1993
INVENTOR(S)  : James W. Wagner, Jr.

It is certified that error appears in the above-indentified patent and that said Letters Patent is hereby corrected as shown below:

Column 8, line 3, "apparatus" should read --method--.

Signed and Sealed this

Fifteenth Day of April, 1997

Attest:

BRUCE LEHMAN

Attesting Officer          Commissioner of Patents and Trademarks